United States Patent
Yang et al.

(10) Patent No.: US 12,341,714 B2
(45) Date of Patent: Jun. 24, 2025

(54) ENHANCEMENT OF PDCP DUPLICATION

(71) Applicant: QUALCOMM Incorporated, San Diego, CA (US)

(72) Inventors: Luanxia Yang, Beijing (CN); Changlong Xu, Beijing (CN); Jing Sun, San Diego, CA (US); Xiaoxia Zhang, San Diego, CA (US); Rajat Prakash, San Diego, CA (US); Hao Xu, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 428 days.

(21) Appl. No.: 18/011,834

(22) PCT Filed: Aug. 13, 2020

(86) PCT No.: PCT/CN2020/108884
§ 371 (c)(1),
(2) Date: Dec. 20, 2022

(87) PCT Pub. No.: WO2022/032569
PCT Pub. Date: Feb. 17, 2022

(65) Prior Publication Data
US 2023/0239085 A1    Jul. 27, 2023

(51) Int. Cl.
*H04L 5/00* (2006.01)
*H04L 1/08* (2006.01)
(Continued)

(52) U.S. Cl.
CPC ............... *H04L 5/001* (2013.01); *H04L 1/08* (2013.01); *H04L 5/0053* (2013.01);
(Continued)

(58) Field of Classification Search
CPC ....... H04L 5/00; H04L 5/0001; H04L 5/0003; H04L 5/0005; H04L 5/0007;
(Continued)

(56) References Cited

U.S. PATENT DOCUMENTS 11,963,257 B2 * 4/2024 Xiao ......................... H04L 1/08
11,991,785 B2 * 5/2024 Xu ......................... H04L 5/0098
(Continued)

FOREIGN PATENT DOCUMENTS

CN    109842907 A    6/2019
CN    110622608 A    12/2019

OTHER PUBLICATIONS

International Search Report and Written Opinion—PCT/CN2020/108884—ISA/EPO—May 13, 2021.
(Continued)

*Primary Examiner* — Warner Wong
(74) *Attorney, Agent, or Firm* — Procopio, Cory, Hargreaves & Savitch LLP

(57) ABSTRACT

The present disclosure relates to methods and devices for wireless communication including an apparatus, e.g., a UE and/or a base station. In one aspect, the apparatus may transmit a list of a plurality of CCs for a transmission of at least one PDCP PDU, the plurality of CCs corresponding to a plurality of indicated CCs. The apparatus may also transmit the at least one PDCP PDU on one or more CCs of the plurality of CCs. Additionally, the apparatus may determine whether to retransmit the at least one PDCP PDU, a retransmission of the at least one PDCP PDU being associated with a PDCP duplication procedure. The apparatus may also select one or more CCs of the plurality of CCs for the retransmission of the at least one PDCP PDU.

30 Claims, 13 Drawing Sheets

(51) Int. Cl.
*H04W 52/36* (2009.01)
*H04W 72/1263* (2023.01)
*H04L 1/1812* (2023.01)
*H04L 1/1867* (2023.01)

(52) U.S. Cl.
CPC ..... *H04W 52/365* (2013.01); *H04W 72/1263* (2013.01); *H04L 1/1816* (2013.01); *H04L 1/189* (2013.01)

(58) Field of Classification Search
CPC ......... H04L 5/0008; H04L 5/001; H04L 1/00; H04L 1/08; H04L 5/003; H04L 5/0053; H04W 52/04; H04W 52/30; H04W 52/36; H04W 52/365; H04W 72/12; H04W 72/1263
See application file for complete search history.

(56) References Cited

U.S. PATENT DOCUMENTS

| 12,238,688 | B2* | 2/2025 | Baek | H04L 1/1812 |
| 2015/0036600 | A1 | 2/2015 | Hong | |
| 2018/0199315 | A1* | 7/2018 | Hong | H04W 76/15 |
| 2018/0279168 | A1* | 9/2018 | Jheng | H04L 5/001 |
| 2018/0309660 | A1* | 10/2018 | Loehr | H04W 36/0066 |
| 2019/0053325 | A1* | 2/2019 | Yu | H04W 76/15 |
| 2019/0254117 | A1* | 8/2019 | Chen | H04L 47/34 |
| 2019/0387437 | A1 | 12/2019 | Cho et al. | |
| 2020/0100317 | A1 | 3/2020 | Jiang | |
| 2021/0176349 | A1* | 6/2021 | Damnjanovic | H04L 1/08 |
| 2021/0211932 | A1* | 7/2021 | Lu | H04L 1/1896 |
| 2021/0258987 | A1* | 8/2021 | Yang | H04W 72/0453 |
| 2021/0297899 | A1* | 9/2021 | Baek | H04L 1/08 |
| 2021/0400503 | A1* | 12/2021 | Wang | H04L 1/08 |
| 2022/0014961 | A1* | 1/2022 | Baek | H04W 28/0263 |

OTHER PUBLICATIONS

NOKIA: "Stage 2 Cleanup", 3GPP TSG-RAN WG2 Meeting #110-e, R2-2005998, May 29, 2020 (May 29, 2020), 6 Pages, the whole document.

* cited by examiner

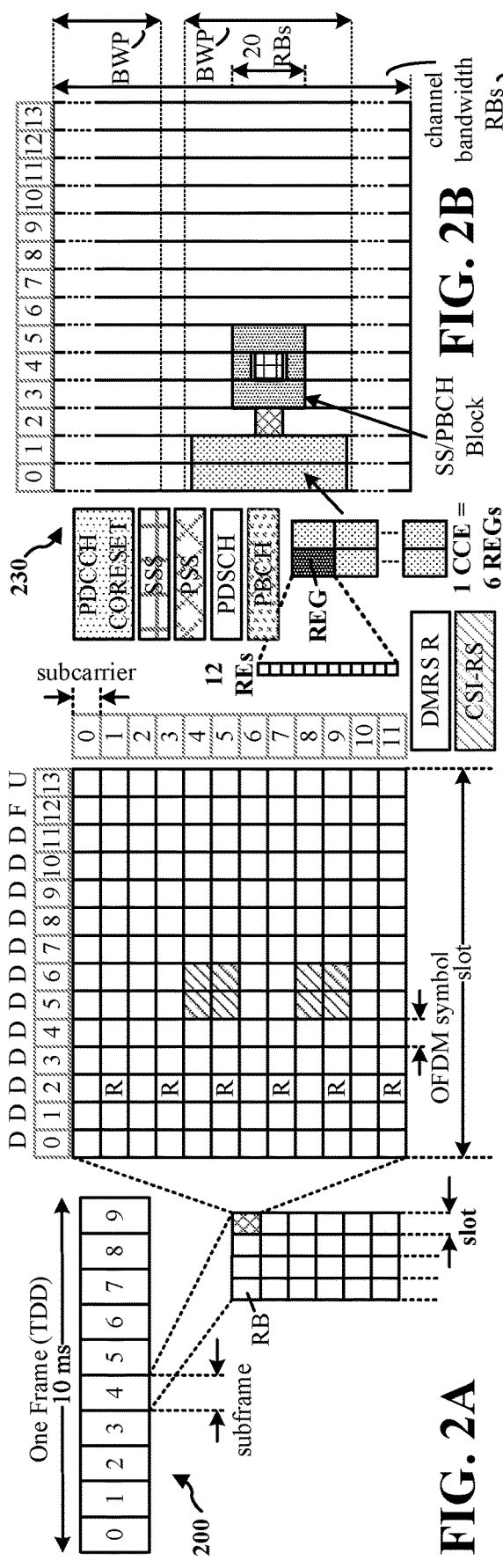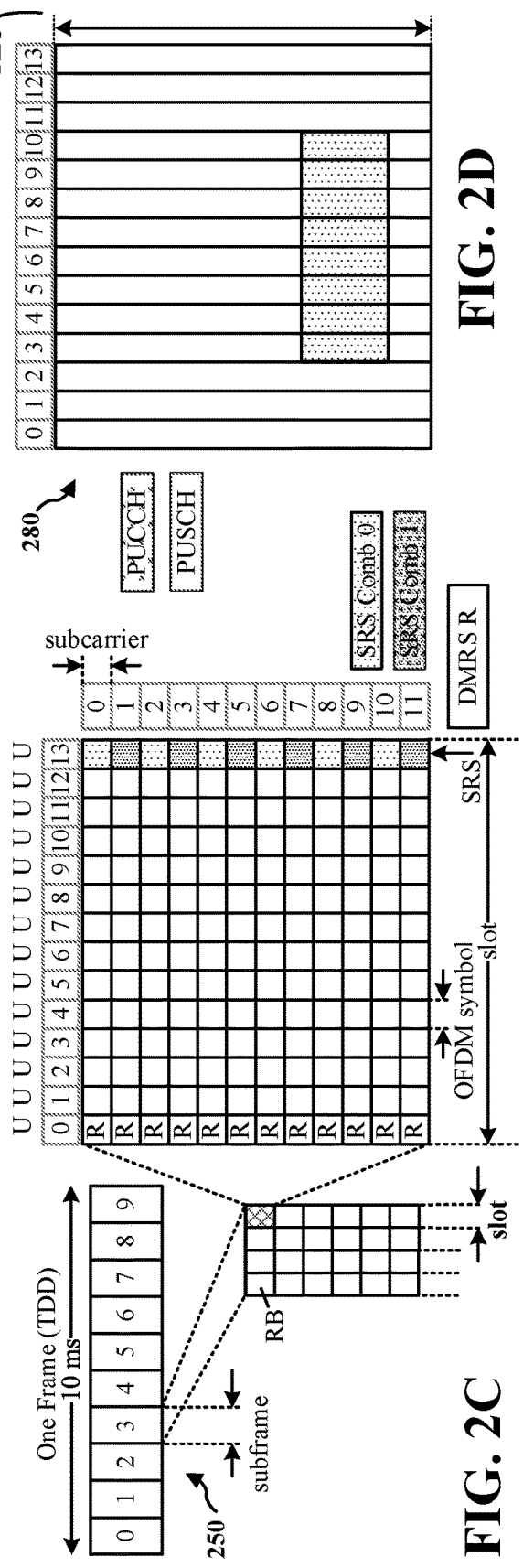
FIG. 2A  FIG. 2B  FIG. 2C  FIG. 2D

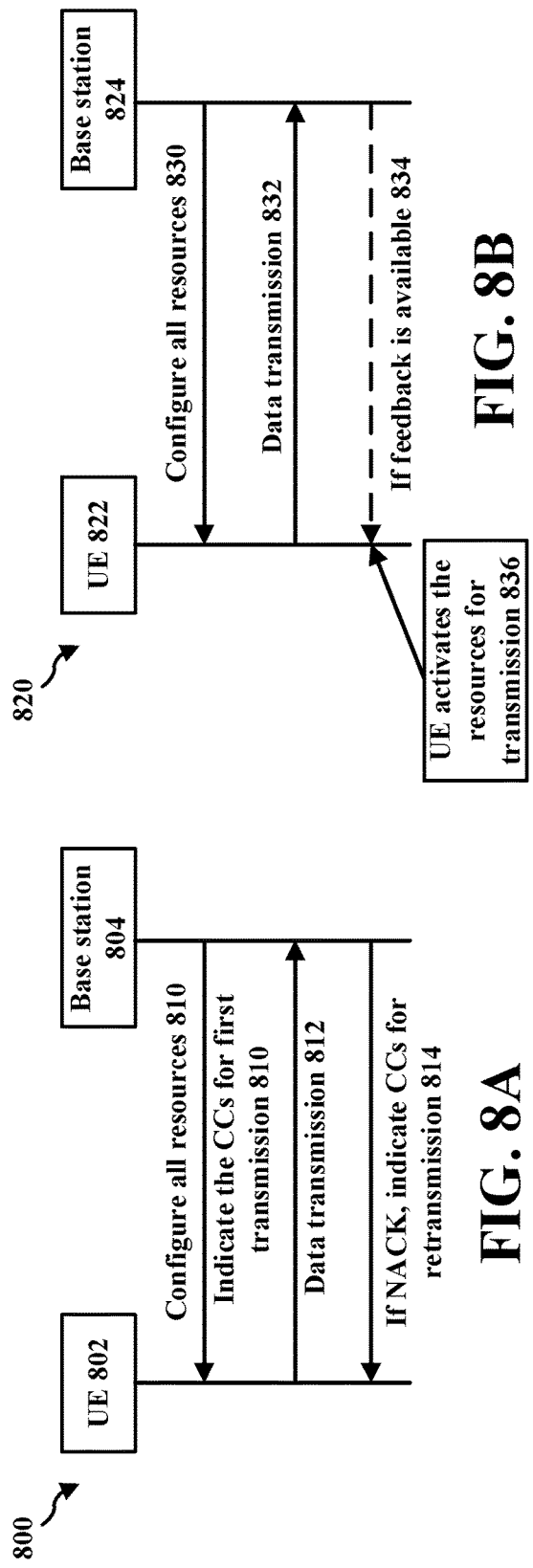
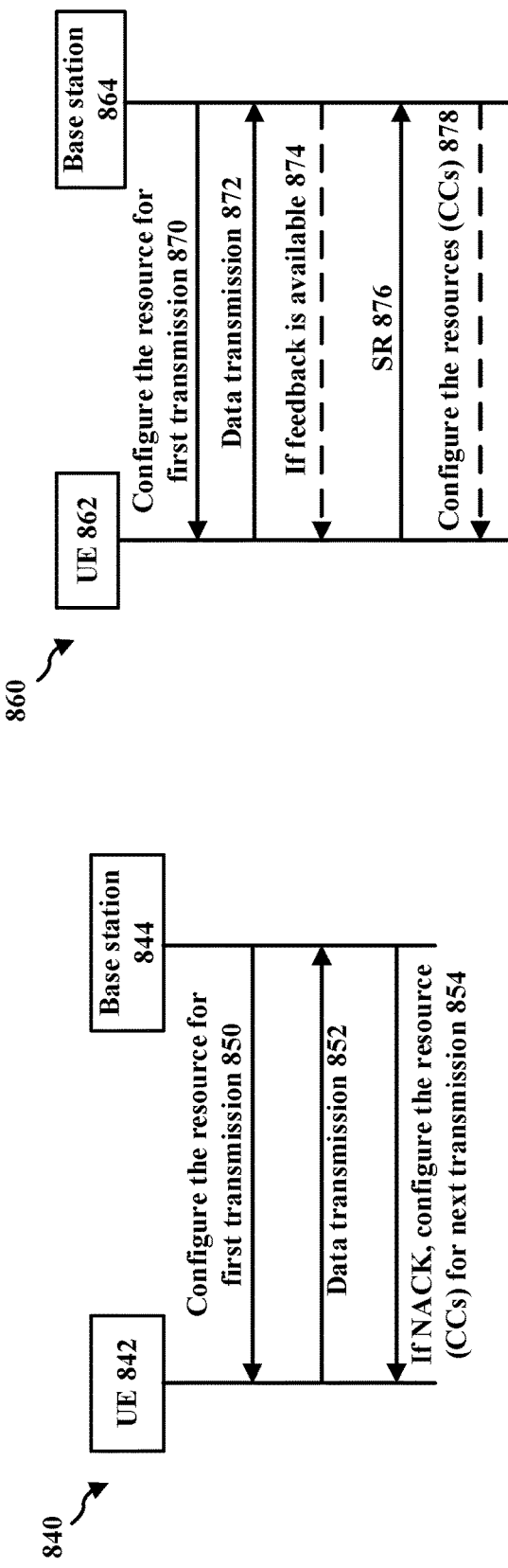

ENHANCEMENT OF PDCP DUPLICATION

CROSS REFERENCE TO RELATED APPLICATION(S)

This application is National Stage Application filed under 35 U.S.C. § 371 of PCT International Application No. PCT/CN2020/108884, entitled "METHODS AND APPARATUS FOR ENHANCEMENT OF PDCP DUPLICATION" and filed Aug. 13, 2020, which is expressly incorporated by reference herein in its entirety.

BACKGROUND

Technical Field

The present disclosure relates generally to communication systems, and more particularly, to transmissions in wireless communication systems.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced (pc)mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a user equipment (UE). The apparatus may receive a configuration of one or more uplink resources for the transmission of the at least one PDCP PDU, where the configuration may be associated with a configured grant. The apparatus may also transmit a list of a plurality of component carriers (CCs) for a transmission of at least one packet data convergence protocol (PDCP) protocol data unit (PDU), the plurality of CCs corresponding to a plurality of indicated CCs. The apparatus may also receive an indication of the plurality of CCs for the transmission of the at least one PDCP PDU. Further, the apparatus may transmit the at least one PDCP PDU on one or more CCs of the plurality of CCs. The apparatus may also determine whether to retransmit the at least one PDCP PDU, a retransmission of the at least one PDCP PDU being associated with a PDCP duplication procedure. The apparatus may also select one or more CCs of the plurality of CCs for the retransmission of the at least one PDCP PDU. Additionally, the apparatus may receive an indication of whether to retransmit the at least one PDCP PDU. The apparatus may also determine whether to activate one or more uplink resources for the retransmission of the at least one PDCP PDU. The apparatus may also transmit a scheduling request (SR) for the retransmission of the at least one PDCP PDU. Moreover, the apparatus may receive a configuration of one or more uplink resources for the retransmission of the at least one PDCP PDU, where the configuration may be associated with a dynamic grant. The apparatus may also retransmit the at least one PDCP PDU based on the determination whether to retransmit the at least one PDCP PDU.

In another aspect of the disclosure, a method, a computer-readable medium, and an apparatus are provided. The apparatus may be a base station. The apparatus may transmit a configuration of one or more uplink resources for the transmission of the at least one PDCP PDU, where the configuration may be associated with a configured grant. The apparatus may also receive a list of a plurality of component carriers (CCs) for a transmission of at least one packet data convergence protocol (PDCP) protocol data unit (PDU), the plurality of CCs corresponding to a plurality of indicated CCs. The apparatus may also transmit an indication of the plurality of CCs for the transmission of the at least one PDCP PDU. Additionally, the apparatus may determine whether the at least one PDCP PDU is retransmitted, a retransmission of the at least one PDCP PDU being associated with a PDCP duplication procedure. The apparatus may also transmit an indication of whether to retransmit the at least one PDCP PDU. The apparatus may also determine whether one or more uplink resources are activated for the retransmission of the at least one PDCP PDU. Further, the apparatus may receive a scheduling request (SR) for the retransmission of the at least one PDCP PDU. The apparatus may also transmit a configuration of one or more uplink resources for the retransmission of the at least one PDCP PDU, where the configuration may be associated with a dynamic grant. The apparatus may also receive a retransmission of the at least one PDCP PDU based on the determination whether the at least one PDCP PDU is retransmitted.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first frame, in accordance with various aspects of the present disclosure.

FIG. 2B is a diagram illustrating an example of DL channels within a subframe, in accordance with various aspects of the present disclosure.

FIG. 2C is a diagram illustrating an example of a second frame, in accordance with various aspects of the present disclosure.

FIG. 2D is a diagram illustrating an example of UL channels within a subframe, in accordance with various aspects of the present disclosure.

FIGS. 8A-8D are diagrams illustrating example resource allocations for PDCP duplication in accordance with one or more techniques of the present disclosure.

DETAILED DESCRIPTION

Figure 1:
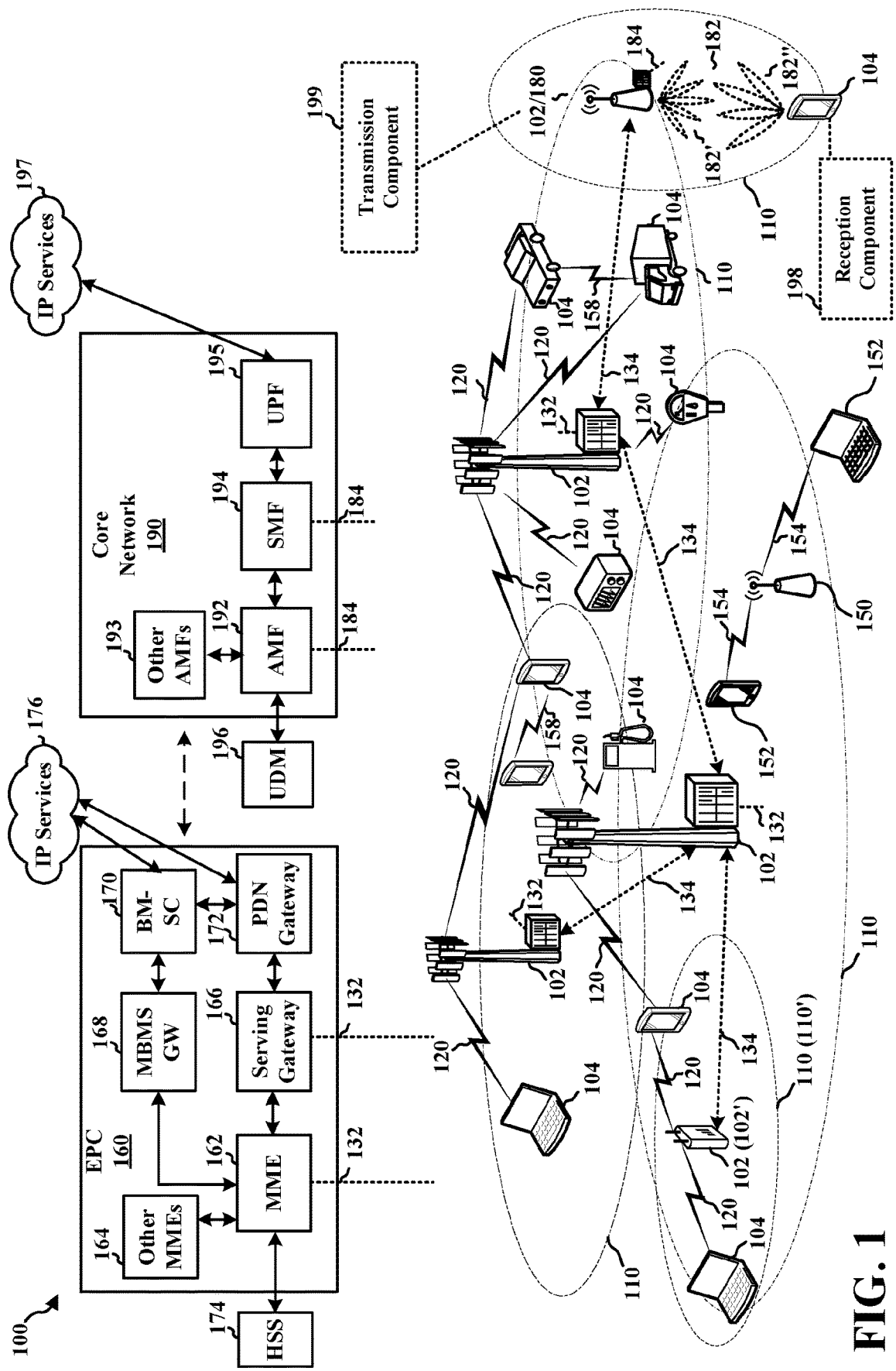
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may include a reception component 198 configured to receive a configuration of one or more uplink resources for the transmission of the at least one PDCP PDU, where the configuration may be associated with a configured grant. Reception component 198 may also be configured to transmit a list of a plurality of component carriers (CCs) for a transmission of at least one packet data convergence protocol (PDCP) protocol data unit (PDU), the plurality of CCs corresponding to a plurality of indicated CCs. Reception component 198 may also be configured to receive an indication of the plurality of CCs for the transmission of the at least one PDCP PDU. Reception component 198 may also be configured to transmit the at least one PDCP PDU on one or more CCs of the plurality of CCs. Reception component 198 may also be configured to determine whether to retransmit the at least one PDCP PDU, a retransmission of the at least one PDCP PDU being associated with a PDCP duplication procedure. Reception component 198 may also be configured to select one or more CCs of the plurality of CCs for the retransmission of the at least one PDCP PDU. Reception component 198 may also be configured to receive an indication of whether to retransmit the at least one PDCP PDU. Reception component 198 may also be configured to determine whether to activate one or more uplink resources for the retransmission of the at least one PDCP PDU. Reception component 198 may also be configured to transmit a scheduling request (SR) for the retransmission of the at least one PDCP PDU. Reception component 198 may also be configured to receive a configuration of one or more uplink resources for the retransmission of the at least one PDCP PDU, where the configuration may be associated with a dynamic grant. Reception component 198 may also be configured to retransmit the at least one PDCP PDU based on the determination whether to retransmit the at least one PDCP PDU.

Referring again to FIG. 1, in certain aspects, the base station 180 may include a transmission component 199 configured to transmit a configuration of one or more uplink resources for the transmission of the at least one PDCP PDU, where the configuration may be associated with a configured grant. Transmission component 199 may also be configured to receive a list of a plurality of component carriers (CCs) for a transmission of at least one packet data convergence protocol (PDCP) protocol data unit (PDU), the plurality of CCs corresponding to a plurality of indicated CCs. Transmission component 199 may also be configured to transmit an indication of the plurality of CCs for the transmission of the at least one PDCP PDU. Transmission component 199 may also be configured to determine whether the at least one PDCP PDU is retransmitted, a retransmission of the at least one PDCP PDU being associated with a PDCP duplication procedure. Transmission component 199 may also be configured to transmit an indication of whether to retransmit the at least one PDCP PDU. Transmission component 199 may also be configured to determine whether one or more uplink resources are activated for the retransmission of the at least one PDCP PDU. Transmission component 199 may also be configured to receive a scheduling request (SR) for the retransmission of the at least one PDCP PDU. Transmission component 199 may also be configured to transmit a configuration of one or more uplink resources for the retransmission of the at least one PDCP PDU, where the configuration may be associated with a dynamic grant.

Transmission component 199 may also be configured to receive a retransmission of the at least one PDCP PDU based on the determination whether the at least one PDCP PDU is retransmitted.

Although the following description may be focused on 5G NR, the concepts described herein may be applicable to other similar areas, such as LTE, LTE-A, CDMA, GSM, and other wireless technologies.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu * 15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 $\mu$s. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARD) ACK/NACK feedback. The PUSCH carries data, and may additionally be used to carry a buffer status report (BSR), a power headroom report (PHR), and/or UCI.

Figure 3:
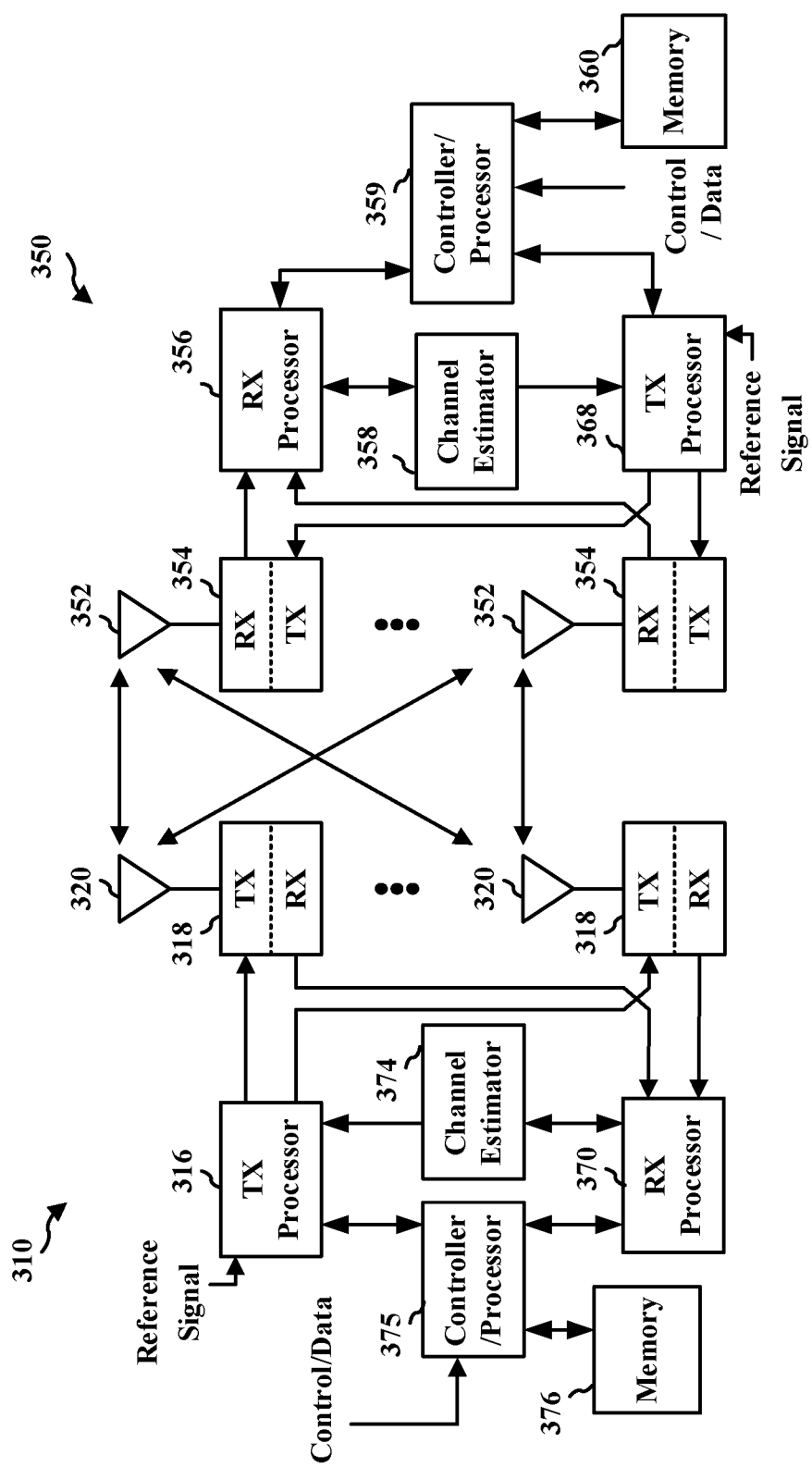
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate an RF carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1.

At least one of the TX processor 316, the RX processor 370, and the controller/processor 375 may be configured to perform aspects in connection with 199 of FIG. 1.

Some aspects of wireless communications include packet data convergence protocol (PDCP) duplication, which involves transmitting multiple copies of the same PDCP protocol data unit (PDU) without waiting for radio link control (RLC) error detection. Downlink PDCP duplication may be realized via base station implementation and may include a number of different aspects. For instance, downlink PDCP duplication may include configuring a UE with multiple downlink (DL) RLC entities mapped to a same PDCP entity. In some instances, a UE may not be aware of which component carriers (CCs) are being used for duplication and whether the base station is actually performing duplication or sending a single copy.

Uplink PDCP duplication may involve more configuration at the UE side. In some aspects, an RLC entity may be mapped to a set of carriers via radio resource control (RRC) configuration, with the two duplicate RLC entities utilizing a non-overlapping set of carriers. Also, a medium access control (MAC) control element (MAC-CE) may be used to turn duplication on or off, i.e., OFF may deactivate the secondary RLC.

Figure 4B:
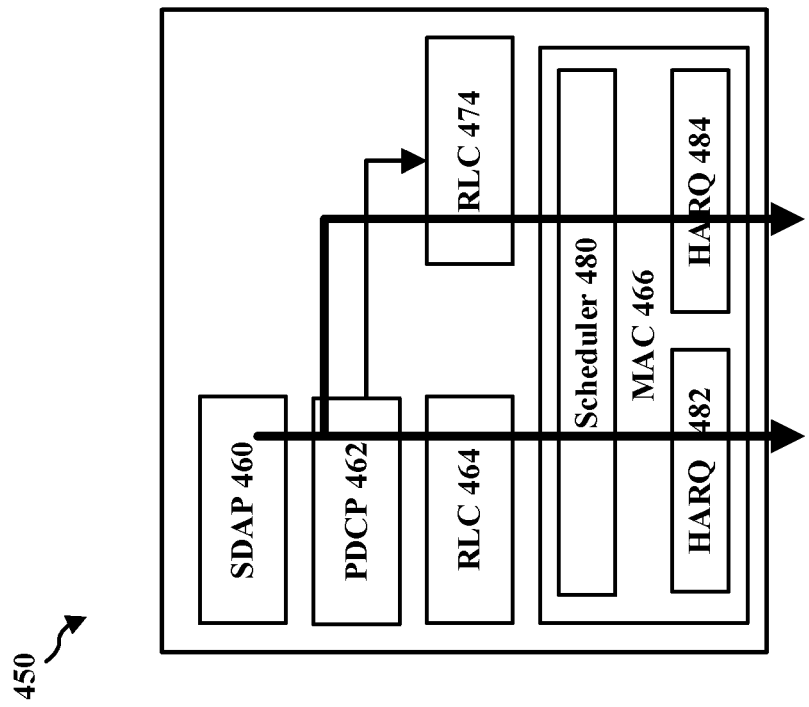
FIG. 4B is a diagram illustrating an example PDCP duplication process in accordance with one or more techniques of the present disclosure.
Figure 4A:
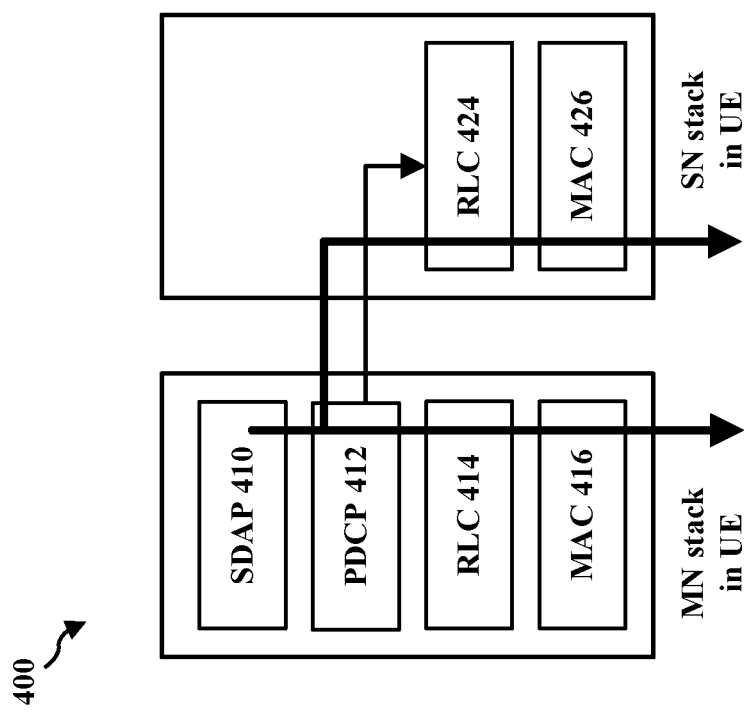
FIG. 4A is a diagram illustrating an example PDCP duplication process in accordance with one or more techniques of the present disclosure.

FIG. 4A is a diagram 400 illustrating an example PDCP duplication process. As shown in FIG. 4A, diagram 400 includes service data adaptation protocol (SDAP) 410, PDCP 412, RLC 414, and MAC 416, which are part of a master node (MN) stack in the UE. Diagram 400 also includes RLC 424 and MAC 426, which are part of a secondary node (SN) stack in the UE. FIG. 4A displays a PDCP duplication process with dual connectivity (DC) using a split bearer.

FIG. 4B is a diagram 450 illustrating an example PDCP duplication process. As shown in FIG. 4B, diagram 450 includes SDAP 460, PDCP 462, RLC 464, RLC 474 and MAC 466. As illustrated in FIG. 4B, MAC 466 includes scheduler 480, HARQ 482, and HARQ 484. FIG. 4B displays a PDCP duplication process with carrier aggregation (CA).

In addition, some aspects of wireless communication include a PDCP duplication process that supports ultra-reliable low latency communication (URLLC), i.e., higher reliability and low latency communication. For instance, these types of PDCP duplication may be used when radio link control (RLC) retransmissions may not satisfy latency specifications.

Some aspects of wireless communications may specify PDCP duplication with up to a certain amount of RLC entities, e.g., four (4) RLC entities, which may be configured by RRC signaling in architectural combinations including CA and new radio (NR) dual connectivity (NR-DC) in combination with CA. Also, some aspects of wireless communications may specify mechanisms relating to dynamic control of how a set or subset of configured RLC entities or legs are used for PDCP duplication. Some aspects of wireless communications may also allow changing a leg configuration via RRC signaling, e.g., in case duplication may be changed from one CC, e.g., CC1 or CC2, to another CC, e.g., CC1 or CC3. Further, some aspects of wireless communications may provide a MAC-CE based UL duplication leg configuration to a UE. Moreover, in some aspects of wireless communications, a work item (WI) may be introduced for enhancement of PDCP duplication.

In some aspects of wireless communications, PDCP duplication may be based on a link condition without consideration of different applications or services. However, it may be beneficial to consider the duplication based on the combination of link condition and applications or services, e.g., to ensure that data is transmitted or received correctly. Within a range of URLLC applications and services, some of the applications or services may have strict reliability and latency specifications. However, another set of URLLC and industrial applications may allow a certain relaxation of latency and/or reliability specifications. PDCP duplication may also be based on base station detection, which can use a MAC-CE to enable duplication. A UE-assisted leg selection or autonomous activation or deactivation may be considered to reduce the amount of latency and increase the reliability.

Some aspects of PDCP duplication may include UE-assisted leg selection or autonomous activation or deactivation. For example, if a number of copies is less than a number of active RLC entities, a UE may select active RLC entities to send the copies. When doing so, the UE may consider listen before talk (LBT) outcomes to allow faster adaptation for new radio (NR) unlicensed spectrum (NR-U). The UE may also consider fast adaptation of a degrading channel or beam. Further, the UE may consider a fast reaction to power headroom changes when sharing across carriers in headroom limited scenarios.

Figure 5:
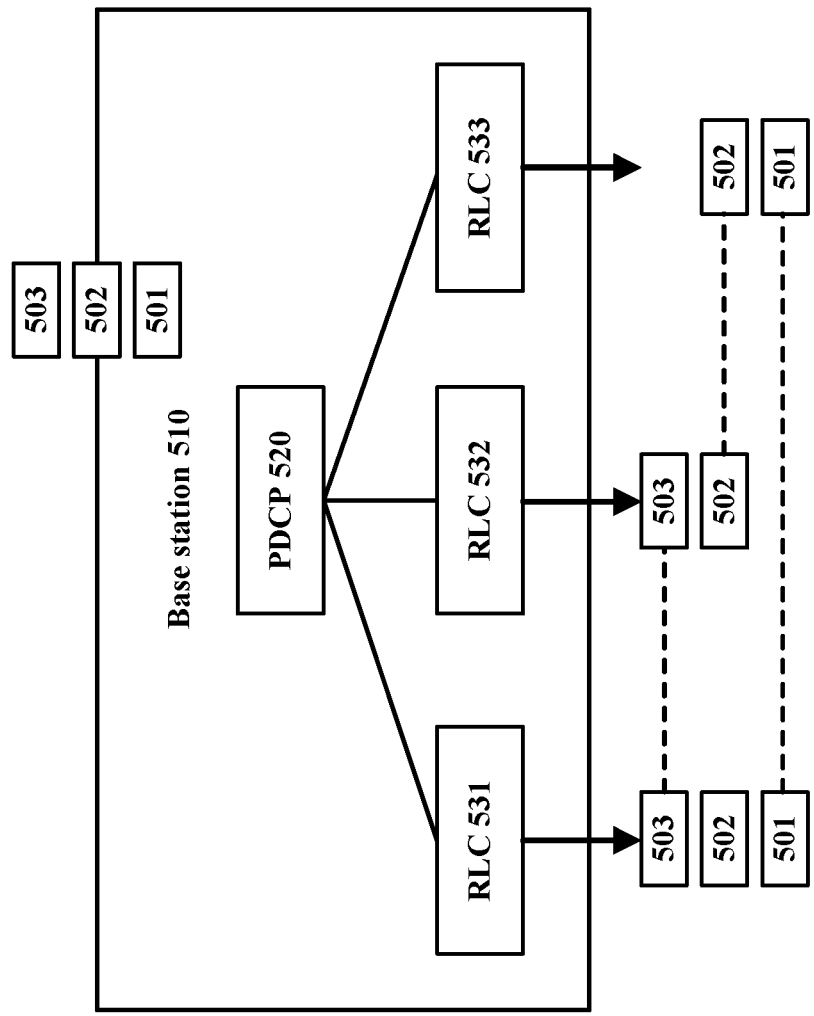
FIG. 5 is a diagram illustrating an example PDCP duplication process in accordance with one or more techniques of the present disclosure.

FIG. 5 is a diagram 500 illustrating an example PDCP duplication process. As shown in FIG. 5, diagram 500 includes PDCP PDU 501, PDCP PDU 502, PDCP PDU 503, base station 510, PDCP 520, RLC 531, RLC 532, and RLC 533. FIG. 5 displays a UE-assisted leg selection with two PDCP PDU copies and three active RLC entities. As shown in FIG. 5, as the number of PDCP PDU copies is less than the number of active RLC entities, the UE may select the active RLC entities to send the copies.

Some aspects of PDCP duplication may include selective duplication. For instance, for each PDCP PDU, a PDCP PDU copy may be sent to one RLC entity, and a timer may be started. If the timer expires, another PDCP PDU copy may be sent to another RLC entity. Further, the timer may be stopped if an RLC entity receives an acknowledgement (ACK) for a first PDCP PDU copy, and no further PDCP PDU copies are sent. Additionally, aspects of wireless communication may decide to perform duplication based on a packet type, e.g., a transmission control protocol (TCP) ACK.

Figure 6:
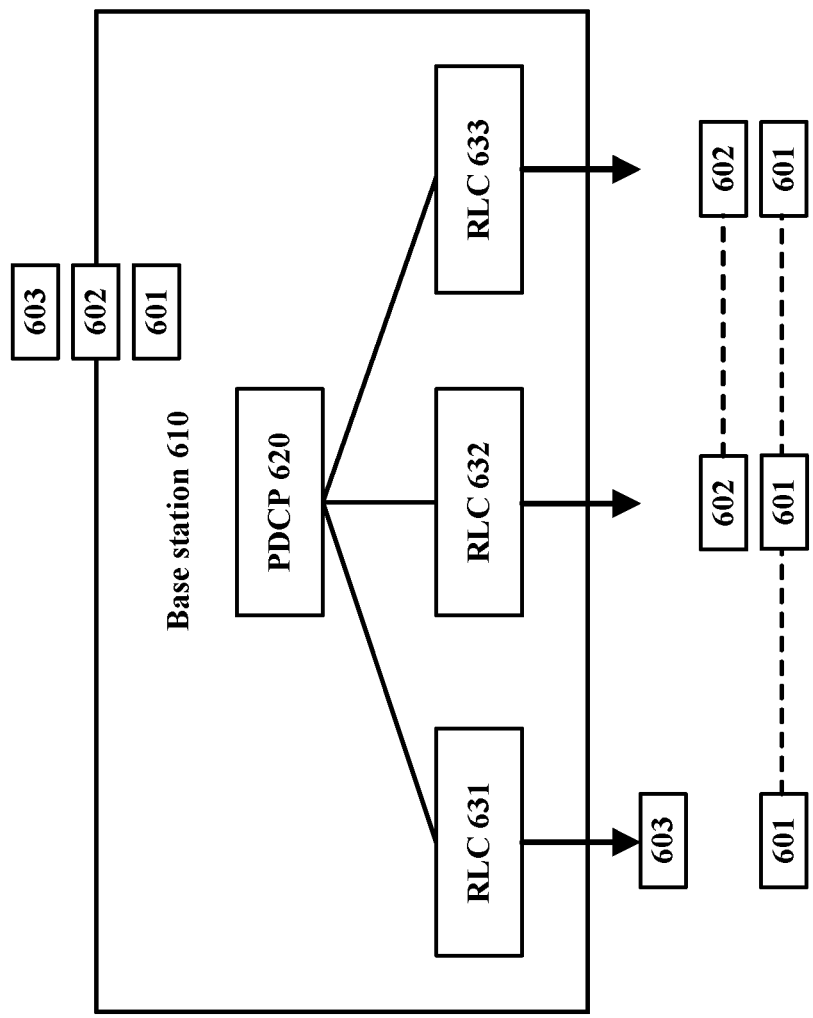
FIG. 6 is a diagram illustrating an example PDCP duplication process in accordance with one or more techniques of the present disclosure.

FIG. 6 is a diagram 600 illustrating an example PDCP duplication process. As shown in FIG. 6, diagram 600 includes PDCP PDU 601, PDCP PDU 602, PDCP PDU 603, base station 610, PDCP 620, RLC 631, RLC 632, and RLC 633. FIG. 6 displays a selective PDCP duplication with a certain number of copies, e.g., up to three (3) PDCP PDU copies. As shown in FIG. 6, for each PDCP PDU, a PDCP PDU copy may be sent to one RLC entity, and a timer may be started. If the timer expires, another PDCP PDU copy may be sent to another RLC entity.

Based on the above, there is a present need for enhanced PDCP duplication procedures. For instance, there is a present need for PDCP duplication procedures that can reduce the amount of latency. There is also a present need for PDCP duplication procedures that may be scheduled dynamically.

Aspects of the present disclosure can include enhanced PDCP duplication procedures and methods. For instance, aspects of the present disclosure can include PDCP duplication procedures and methods with a reduced amount of latency. Additionally, aspects of the present disclosure can include PDCP duplication procedures and methods that may be scheduled dynamically. Aspects of the present disclosure can utilize physical layer feedback to reduce the amount of latency, e.g., rather than being based on upper layer feedback.

Aspects of the present disclosure may include PDCP duplication procedures for uplink communication. In some aspects, a UE may report indicated component carriers (CCs) to a base station, and the base station may indicate the CCs on which the UE may transmit the PDCP PDU. The number of CCs may depend on a latency specification of a package, i.e., more CCs may be indicated for the UE if a survival time for the package is shorter.

Figure 7:
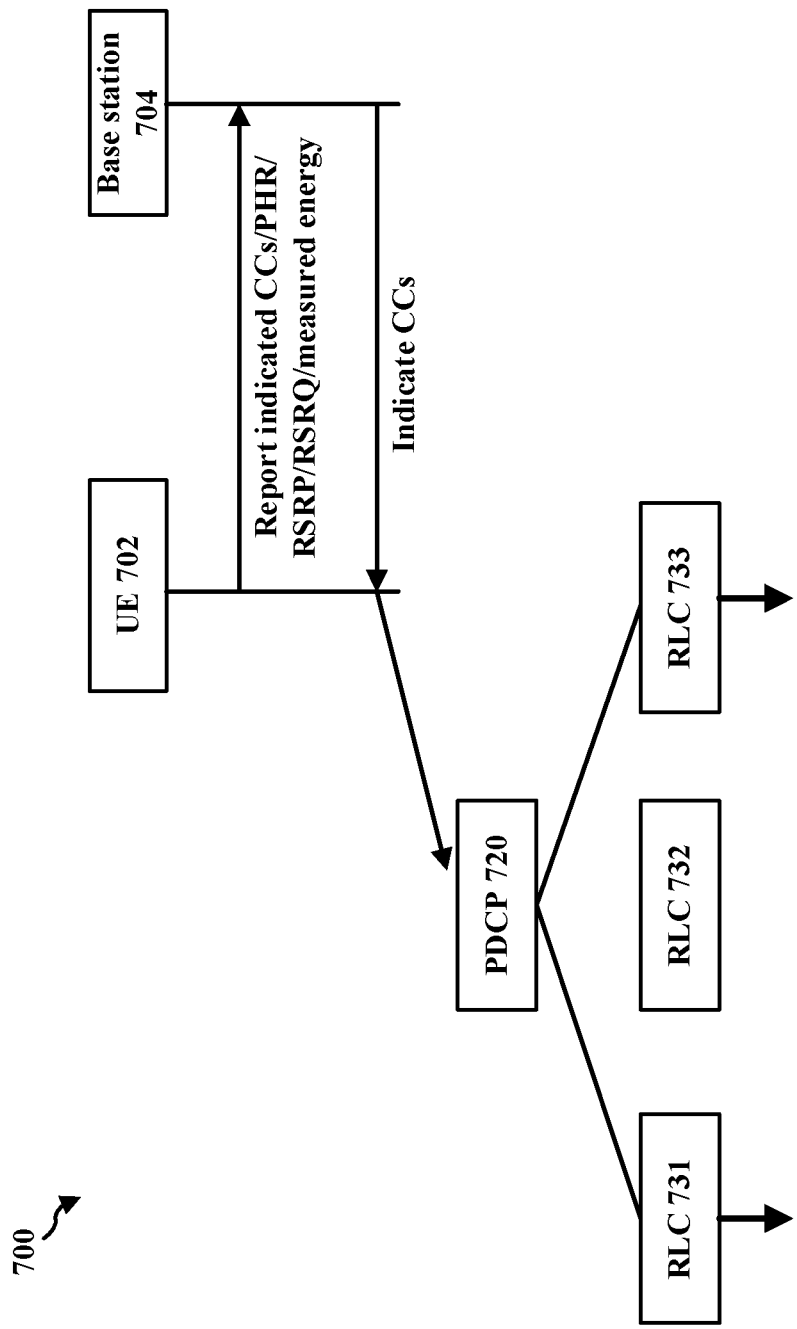
FIG. 7 is a diagram illustrating an example PDCP duplication process in accordance with one or more techniques of the present disclosure.

FIG. 7 is a diagram 700 illustrating an example PDCP duplication process in accordance with one or more techniques of the present disclosure. As shown in FIG. 7, diagram 700 includes UE 702, base station 704, PDCP 720, RLC 731, RLC 732, and RLC 733. As shown in FIG. 7, the UE 702 may report a number of indicated CCs to the base station 704, as well as report a power headroom report (PHR), a reference signal received power (RSRP), a reference signal received quality (RSRQ), and/or a measured energy to the base station 704. The base station 704 can then indicate one or more CCs to the UE 702.

In some aspects, the UE may determine the CCs on which to send the PDCP PDU copies if the PDCP PDU is retransmitted. This action may be conditioned on a power headroom (PH). For instance, if the PH indicates the transmitted power is greater than an allowed transmit power, the base station may not configure a CC for the UE. If the first PDCP PDU transmission fails, one or more CCs may be added and these added CCs may be used to transmit the PDCP PDU copies, where the CC used during the first transmission may be used for the subsequent transmissions. The procedure may be repeated until the PDCP PDU is received successfully, or a maximum duplication number is reached, or a PHR is non-positive.

Additionally, some CCs may be utilized for certain types of wireless communications, e.g., LTE, and other CCs may be utilized for other types of wireless communications, e.g., NR. Also, some CCs may be in a certain frequency range, e.g., a first frequency range (FR1), and other CCs may be in another frequency range, e.g., a second frequency range (FR2). Further, some CCs may be in an unlicensed band, and other CCs may be in a licensed band.

In some aspects, if a PDCP PDU is received successfully, or the maximum PDCP PDU duplication number is reached, or a PHR is not allowed for an additional CC, the UE may not transmit any new copies of the PDCP PDU. However, if none of these steps have been reached, e.g., the PDCP PDU is not received successfully, or the maximum PDCP PDU duplication number is not reached, or a PHR is allowed for an additional CC, then the UE may go back to determining the CCs on which to send the PDCP PDU copies if the PDCP PDU is to be retransmitted.

Aspects of the present disclosure can include a CC selection for the PDCP PDU transmission. In some aspects, a UE may indicate one or more emphasized or indicated CCs to a base station based on PH and/or measured energy. Instantaneous PH may indicate whether there is some space for additional PDCP PDU duplication under the maximum power on time. Also, whether the indicated CCs are used or not used may depend on the base station. The UE can also indicate the priority of indicated CCs to the base station. For example, the UE may indicate multiple indicated CCs to the base station.

Additionally, a base station may select the CC based on the reported PHR, RSRP, RSRQ, and/or measured energy. For instance, the base station may select the CC based on the reported measured energy. This measured energy may be the energy used to compare with an energy detection (ED) threshold. Also, the energy may be measured by the base station, or measured by the UE and reported to the base station. If a current measured energy is not available, the base station may use the latest available measured energy to select the CC.

The base station may also select the CC based on the reported PHR, the RSRP, or the RSRQ. The CC can be selected based on the latest reported PHR, RSRP, or RSRQ. The base station may also average the RSRP or RSRQ on the time domain, or select the CC based on the averaged RSRP or RSRQ. Further, a base station may select the CC based on the combination of the aforementioned options.

Aspects of the present disclosure may also include a PDCP PDU retransmission determination. In some aspects, the present disclosure may determine whether to retransmit a PDCP PDU based on a physical layer. If any data package corresponding to the PDCP PDU results in a negative ACK (NACK), the PDCP PDU may be retransmitted. In some instances, the UE may determine the PDCP PDU retransmission based on a configured grant. The UE may determine which CC, or how many CCs, may be used for the PDCP PDU retransmission. During the data transmission, if the feedback of some CCs results in a NACK, these CCs may be withdrawn and the CCs with an ACK may be used for next transmission. Also, a UE triggering the PDCP PDU retransmission may be more suitable for introducing PDCP duplication when there is a small delivery time frame. For an unlicensed band, if downlink feedback information (DFI) is not received or a retransmission timer expires, the UE may trigger the PDCP PDU retransmission. For a licensed band, if an uplink retransmission grant is received or the retransmission timer expires, the UE may trigger the PDCP PDU retransmission.

Additionally, in some aspects, the base station may determine the PDCP PDU retransmission. If the received data results in a NACK or the retransmission timer expires, the base station may indicate to the UE to retransmit the PDCP PDU. In some instances, it may be difficult to determine the PDCP PDU retransmission if the base station did not receive the data. For NR-U, the base station may determine which TB size is used for the transmission.

In some aspects, the PDCP PDU retransmission may be determined based on a MAC-CE from the base station. For instance, a MAC-CE may be introduced to indicate whether a PDCP PDU retransmission may be needed or not. Also, a MAC-CE may be introduced to indicate which CC and/or how many CCs may be used for the PDCP PDU transmission.

Aspects of the present disclosure can also include a resource allocation for a PDCP PDU retransmission. In some aspects, the PDCP PDU may be retransmitted based on a configured grant. For instance, the base station may configure each available resource for the UE before the first transmission of each PDCP PDU. If the duplication number of the PDCP PDU is a certain number, e.g., two (2), the base station may configure this number of resources, e.g., two (2) resources, for the UE before the first transmission of the PDCP PDU. Once the current PDCP PDU procedure is completed, each of the resources may be released.

Aspects of the present disclosure can also include a number of options to active the resources. In some instances, the base station may send an activate indication to the UE at each transmission. Also, the base station may predefine the activation order of the resources before the first transmission of PDCP PDU. At each transmission of the PDCP PDU, the UE may autonomously activate and add one of the resources to transmit PDCP PDU copies based on a predefined order. Before the resources are activated, the base station may schedule other UEs to use these resources. Further, the UE may autonomously activate the resources for the PDCP PDU retransmission. During the PDCP duplication procedure, other UEs may not use the activated resources.

Aspects of the present disclosure may also retransmit the PDCP PDU based on a dynamic grant. In some instances, the base station may indicate the resource via an UL grant for the UE at each transmission of the PDCP PDU. The base station may first indicate one resource via the UL grant for the UE to transmit the PDCP PDU. If the first transmission fails, the base station may add a resource and indicate this resource via UL grant to the UE. The UE may use these indicated resources to transmit the PDCP PDU copies. This procedure may be repeated until the PDCP PDU is received successfully or a maximum duplication number is reached. Additionally, the UE may transmit a scheduling request (SR) to the base station, and the base station may indicate the resource for the PDCP PDU transmission.

FIG. 8A is a diagram 800 illustrating an example resource allocation for a PDCP duplication procedure. As shown in FIG. 8A, diagram 800 includes UE 802 and base station 804. At 810, base station 804 may configure all resources, and indicate the CCs for the first PDCP PDU transmission. At 812, the UE 802 may transmit data. At 814, if there is a NACK, the base station 804 may indicate the CCs for the PDCP PDU retransmission.

FIG. 8B is a diagram 820 illustrating an example resource allocation for a PDCP duplication procedure. As shown in FIG. 8B, diagram 820 includes UE 822 and base station 824. At 830, base station 824 may configure all resources. At 832, the UE 822 may transmit data. At 834, if feedback is available, the base station 824 may provide feedback. At 836, the UE 822 may activate the resources for the PDCP PDU transmission.

FIG. 8C is a diagram 840 illustrating an example resource allocation for a PDCP duplication procedure. As shown in FIG. 8C, diagram 840 includes UE 842 and base station 844. At 850, base station 844 may configure the resource for the first PDCP PDU transmission. At 852, the UE 842 may transmit data. At 854, if there is a NACK, the base station 844 may configure the resource, e.g., CCs, for the next PDCP PDU transmission.

FIG. 8D is a diagram 860 illustrating an example resource allocation for a PDCP duplication procedure. As shown in FIG. 8D, diagram 860 includes UE 862 and base station 864. At 870, base station 864 may configure the resource for the first PDCP PDU transmission. At 872, the UE 862 may transmit data. At 874, if feedback is available, the base station 864 may provide feedback. At 876, the UE 862 may transmit a SR. At 878, the base station 864 may configure the resources, e.g., CCs.

Figure 9:
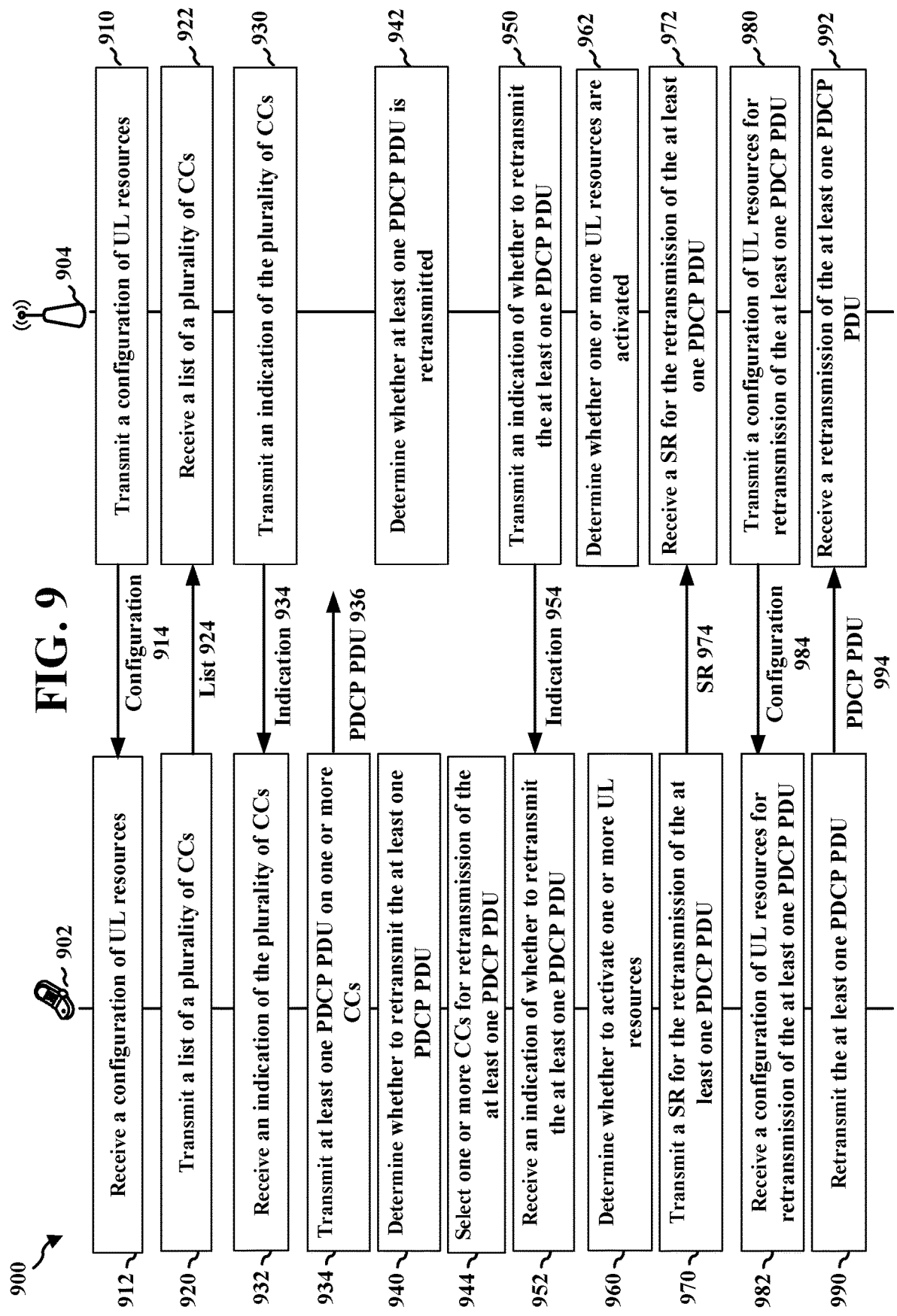
FIG. 9 is a diagram illustrating example communication between a UE and a base station in accordance with one or more techniques of the present disclosure.

FIG. 9 is a diagram 900 illustrating example communication between a UE 902 and a base station 904.

At 910, base station 904 may transmit a configuration of one or more uplink resources for the transmission of the at least one PDCP PDU, e.g., configuration 914, where the configuration may be associated with a configured grant. At 912, UE 902 may receive a configuration of one or more uplink resources for the transmission of the at least one PDCP PDU, e.g., configuration 914, where the configuration may be associated with a configured grant.

At 920, UE 902 may transmit a list of a plurality of CCs for a transmission of at least one PDCP PDU, e.g., list 924, the plurality of CCs corresponding to a plurality of indicated CCs. At 922, base station 904 may receive a list of a plurality of CCs for a transmission of at least one PDCP PDU, e.g., list 924, the plurality of CCs corresponding to a plurality of indicated CCs.

At 930, base station 904 may transmit an indication of the plurality of CCs for the transmission of the at least one PDCP PDU, e.g., indication 934. At 932, UE 902 may receive an indication of the plurality of CCs for the transmission of the at least one PDCP PDU, e.g., indication 934.

At 934, UE 902 may transmit the at least one PDCP PDU, e.g., PDCP PDU 936, on one or more CCs of the plurality of CCs.

At 940, UE 902 may determine whether to retransmit the at least one PDCP PDU, a retransmission of the at least one PDCP PDU being associated with a PDCP duplication procedure. At 942, base station 904 may determine whether the at least one PDCP PDU is retransmitted, a retransmission of the at least one PDCP PDU being associated with a PDCP duplication procedure. In some instances, the determination whether to retransmit the at least one PDCP PDU may be associated with a feedback of at least one physical layer. Also, the determination whether to retransmit the at least one PDCP PDU may be based on at least one of a power headroom or an expiration of a time period.

At 944, UE 902 may select one or more CCs of the plurality of CCs for the retransmission of the at least one PDCP PDU. In some aspects, at least one CC of the one or more CCs may be associated with the retransmission of the at least one PDCP PDU when the at least one CC corresponds to an acknowledgement (ACK). Also, at least one CC may be dissociated from the retransmission of the at least one PDCP PDU when the at least one CC corresponds to a negative ACK (NACK).

At 950, base station 904 may transmit an indication of whether to retransmit the at least one PDCP PDU, e.g., indication 954. At 952, UE 902 may receive an indication of whether to retransmit the at least one PDCP PDU, e.g., indication 954. In some instances, the indication may identify one or more additional CCs of the plurality of CCs for the retransmission of the at least one PDCP PDU. Also, the indication may be associated with an acknowledgement (ACK) or a negative ACK (NACK). Further, the indication may be received or transmitted via a medium access control (MA) control element (MAC-CE).

At 960, UE 902 may determine whether to activate one or more uplink resources for the retransmission of the at least one PDCP PDU. At 962, base station 904 may determine whether one or more uplink resources are activated for the retransmission of the at least one PDCP PDU.

At 970, UE 902 may transmit a scheduling request (SR) for the retransmission of the at least one PDCP PDU, e.g., SR 974. At 972, base station 904 may receive a scheduling request (SR) for the retransmission of the at least one PDCP PDU, e.g., SR 974.

At 980, base station 904 may transmit a configuration of one or more uplink resources for the retransmission of the at least one PDCP PDU, e.g., configuration 984, where the configuration may be associated with a dynamic grant. At 982, UE 902 may receive a configuration of one or more uplink resources for the retransmission of the at least one PDCP PDU, e.g., configuration 984, where the configuration may be associated with a dynamic grant.

At 990, UE 902 may retransmit the at least one PDCP PDU, e.g., PDCP PDU 994, based on the determination whether to retransmit the at least one PDCP PDU. At 992, base station 904 may receive a retransmission of the at least one PDCP PDU, e.g., PDCP PDU 994, based on the determination whether the at least one PDCP PDU is retransmitted. In some aspects, the at least one PDCP PDU may be retransmitted when a PDCP PDU duplication number is less than a maximum threshold, or the retransmission of the at least one PDCP PDU may be based on a power headroom report (PHR).

Figure 10:
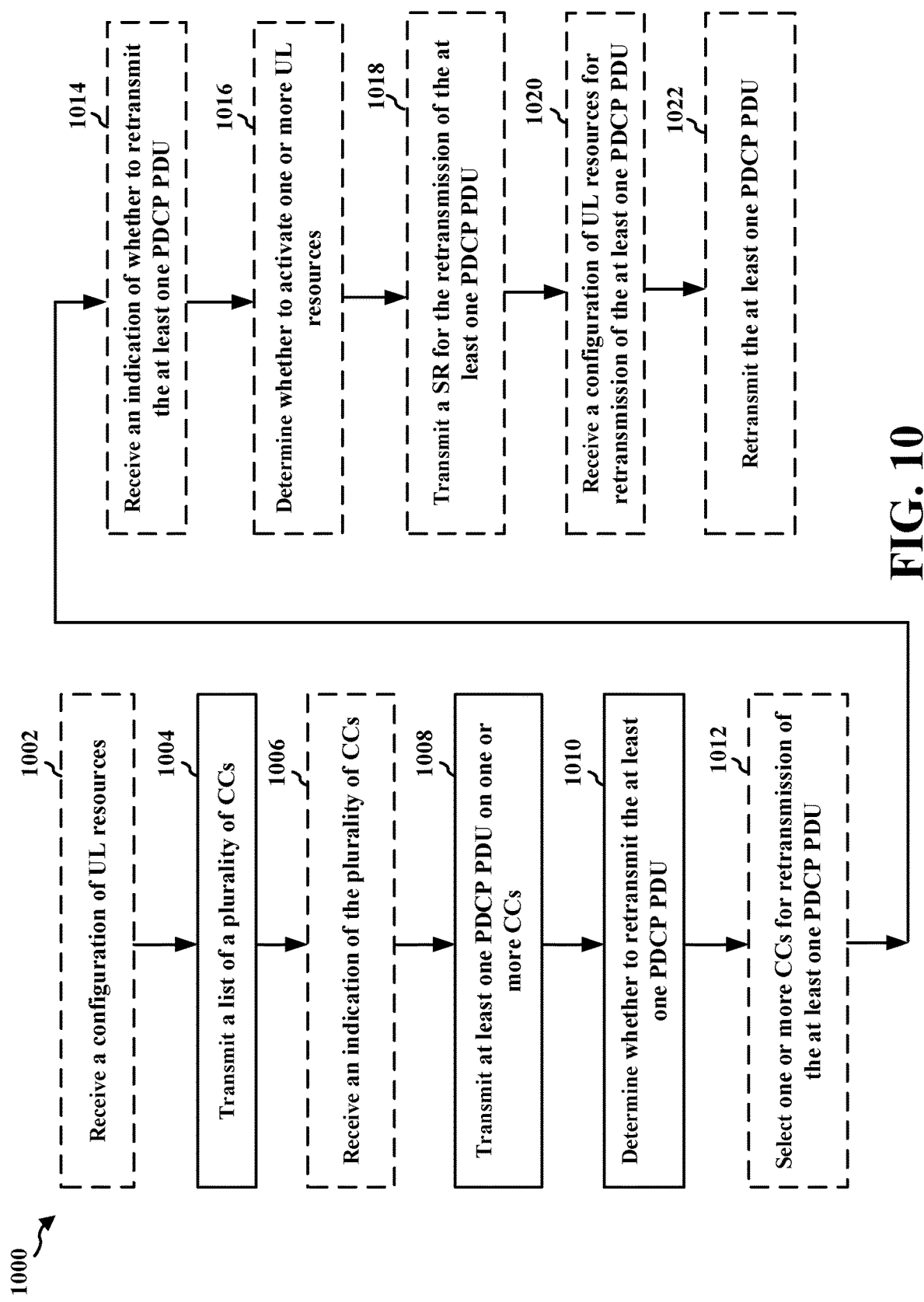
FIG. 10 is a flowchart of a method of wireless communication.

FIG. 10 is a flowchart 1000 of a method of wireless communication. The method may be performed by a UE or a component of a UE (e.g., the UE 104, 350, 902; the apparatus 1202; a processing system, which may include the memory 360 and which may be the entire UE or a component of the UE, such as the TX processor 368, the controller/processor 359, transmitter 354TX, antenna(s) 352, and/or the like). Optional aspects are illustrated with a dashed line. The methods described herein can provide a number of benefits, such as improving communication signaling, resource utilization, and/or power savings.

At 1002, the apparatus may receive a configuration of one or more uplink resources for the transmission of the at least one PDCP PDU, where the configuration may be associated with a configured grant, as described in connection with the examples in FIGS. 4A, 4B, 5, 6, 7, 8A-8D, and 9. For example, 1002 may be performed by determination component 1240.

At 1004, the apparatus may transmit a list of a plurality of CCs for a transmission of at least one PDCP PDU, the plurality of CCs corresponding to a plurality of indicated CCs, as described in connection with the examples in FIGS. 4A, 4B, 5, 6, 7, 8A-8D, and 9. For example, 1004 may be performed by determination component 1240.

At 1006, the apparatus may receive an indication of the plurality of CCs for the transmission of the at least one PDCP PDU, as described in connection with the examples in FIGS. 4A, 4B, 5, 6, 7, 8A-8D, and 9. For example, 1006 may be performed by determination component 1240.

At 1008, the apparatus may transmit the at least one PDCP PDU on one or more CCs of the plurality of CCs, as described in connection with the examples in FIGS. 4A, 4B, 5, 6, 7, 8A-8D, and 9. For example, 1008 may be performed by determination component 1240.

At 1010, the apparatus may determine whether to retransmit the at least one PDCP PDU, a retransmission of the at least one PDCP PDU being associated with a PDCP duplication procedure, as described in connection with the examples in FIGS. 4A, 4B, 5, 6, 7, 8A-8D, and 9. For example, 1010 may be performed by determination component 1240. In some instances, the determination whether to retransmit the at least one PDCP PDU may be associated with a feedback of at least one physical layer, as described in connection with the examples in FIGS. 4A, 4B, 5, 6, 7, 8A-8D, and 9. Also, the determination whether to retransmit the at least one PDCP PDU may be based on at least one of a power headroom or an expiration of a time period, as described in connection with the examples in FIGS. 4A, 4B, 5, 6, 7, 8A-8D, and 9.

At 1012, the apparatus may select one or more CCs of the plurality of CCs for the retransmission of the at least one PDCP PDU, as described in connection with the examples in FIGS. 4A, 4B, 5, 6, 7, 8A-8D, and 9. For example, 1012 may be performed by determination component 1240. In some aspects, at least one CC of the one or more CCs may be associated with the retransmission of the at least one PDCP PDU when the at least one CC corresponds to an acknowledgement (ACK), as described in connection with the examples in FIGS. 4A, 4B, 5, 6, 7, 8A-8D, and 9. Also, at least one CC may be dissociated from the retransmission of the at least one PDCP PDU when the at least one CC corresponds to a negative ACK (NACK), as described in connection with the examples in FIGS. 4A, 4B, 5, 6, 7, 8A-8D, and 9.

At 1014, the apparatus may receive an indication of whether to retransmit the at least one PDCP PDU, as described in connection with the examples in FIGS. 4A, 4B, 5, 6, 7, 8A-8D, and 9. For example, 1014 may be performed by determination component 1240. In some instances, the indication may identify one or more additional CCs of the plurality of CCs for the retransmission of the at least one PDCP PDU, as described in connection with the examples in FIGS. 4A, 4B, 5, 6, 7, 8A-8D, and 9. Also, the indication may be associated with an acknowledgement (ACK) or a negative ACK (NACK), as described in connection with the examples in FIGS. 4A, 4B, 5, 6, 7, 8A-8D, and 9. Further, the indication may be received or transmitted via a medium access control (MA) control element (MAC-CE), as described in connection with the examples in FIGS. 4A, 4B, 5, 6, 7, 8A-8D, and 9.

At 1016, the apparatus may determine whether to activate one or more uplink resources for the retransmission of the at least one PDCP PDU, as described in connection with the examples in FIGS. 4A, 4B, 5, 6, 7, 8A-8D, and 9. For example, 1016 may be performed by determination component 1240.

At 1018, the apparatus may transmit a scheduling request (SR) for the retransmission of the at least one PDCP PDU, as described in connection with the examples in FIGS. 4A, 4B, 5, 6, 7, 8A-8D, and 9. For example, 1018 may be performed by determination component 1240.

At 1020, the apparatus may receive a configuration of one or more uplink resources for the retransmission of the at least one PDCP PDU, where the configuration may be associated with a dynamic grant, as described in connection with the examples in FIGS. 4A, 4B, 5, 6, 7, 8A-8D, and 9. For example, 1020 may be performed by determination component 1240.

At 1022, the apparatus may retransmit the at least one PDCP PDU based on the determination whether to retransmit the at least one PDCP PDU, as described in connection with the examples in FIGS. 4A, 4B, 5, 6, 7, 8A-8D, and 9. For example, 1022 may be performed by determination component 1240. In some aspects, the at least one PDCP PDU may be retransmitted when a PDCP PDU duplication number is less than a maximum threshold, or the retransmission of the at least one PDCP PDU may be based on a power headroom report (PHR), as described in connection with the examples in FIGS. 4A, 4B, 5, 6, 7, 8A-8D, and 9.

Figure 11:
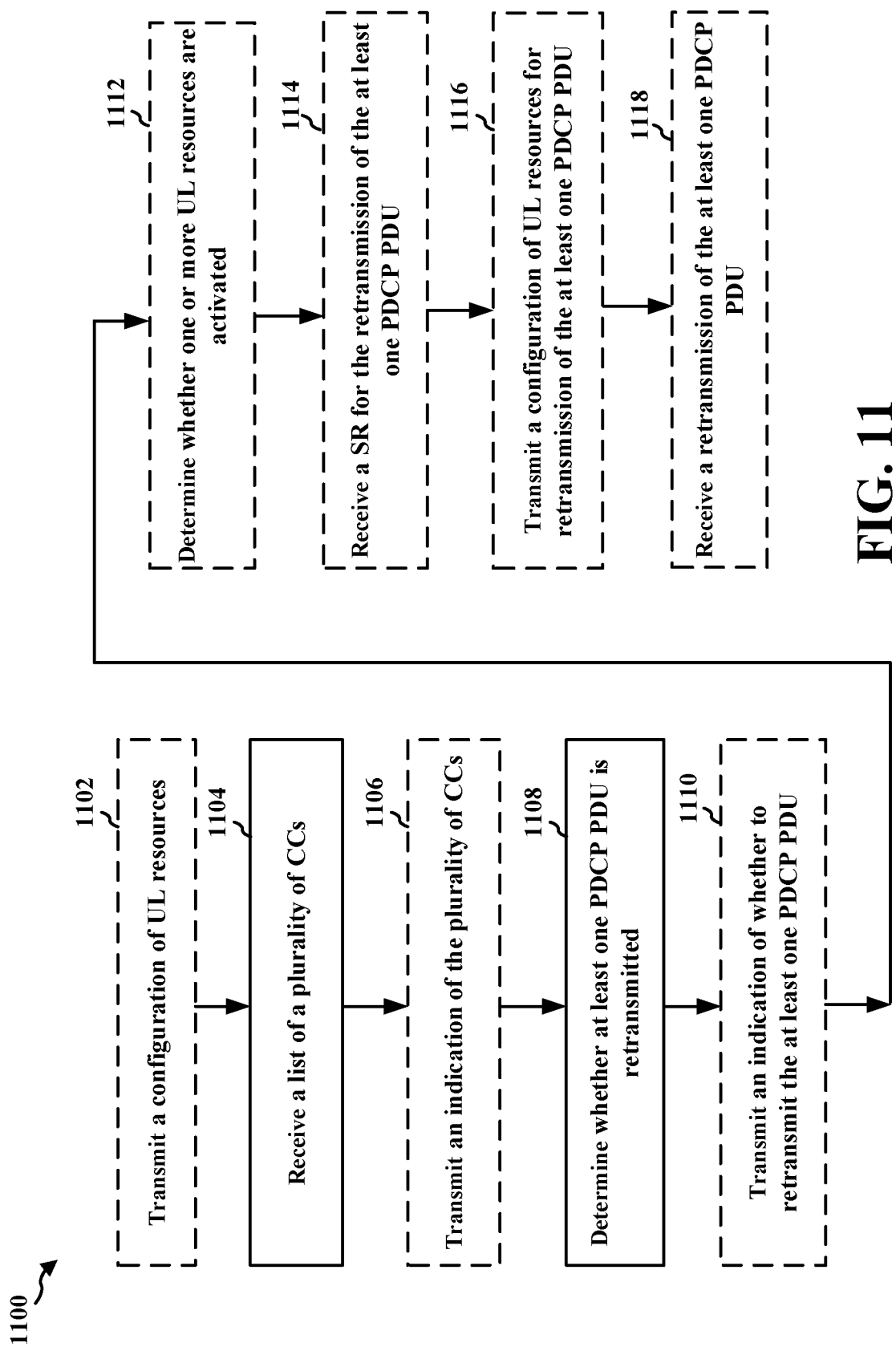
FIG. 11 is a flowchart of a method of wireless communication.

FIG. 11 is a flowchart 1100 of a method of wireless communication. The method may be performed by a base station or a component of a base station (e.g., the base station 102, 180, 310, 904; the apparatus 1302; a processing system, which may include the memory 376 and which may be the entire base station or a component of the base station, such as the antenna(s) 320, receiver 318RX, the RX processor 370, the controller/processor 375, and/or the like). Optional aspects are illustrated with a dashed line. The methods described herein can provide a number of benefits, such as improving communication signaling, resource utilization, and/or power savings.

At 1102, the apparatus may transmit a configuration of one or more uplink resources for the transmission of the at least one PDCP PDU, where the configuration may be associated with a configured grant, as described in connection with the examples in FIGS. 4A, 4B, 5, 6, 7, 8A-8D, and 9. For example, 1102 may be performed by determination component 1340.

At 1104, the apparatus may receive a list of a plurality of component carriers (CCs) for a transmission of at least one packet data convergence protocol (PDCP) protocol data unit (PDU), the plurality of CCs corresponding to a plurality of indicated CCs, as described in connection with the examples in FIGS. 4A, 4B, 5, 6, 7, 8A-8D, and 9. For example, 1104 may be performed by determination component 1340.

At 1106, the apparatus may transmit an indication of the plurality of CCs for the transmission of the at least one PDCP PDU, as described in connection with the examples in FIGS. 4A, 4B, 5, 6, 7, 8A-8D, and 9. For example, 1106 may be performed by determination component 1340.

At 1108, the apparatus may determine whether the at least one PDCP PDU is retransmitted, a retransmission of the at least one PDCP PDU being associated with a PDCP duplication procedure, as described in connection with the examples in FIGS. 4A, 4B, 5, 6, 7, 8A-8D, and 9. For example, 1108 may be performed by determination component 1340. In some instances, the determination whether the at least one PDCP PDU is retransmitted may be associated with a feedback of at least one physical layer, as described in connection with the examples in FIGS. 4A, 4B, 5, 6, 7, 8A-8D, and 9. Moreover, the determination whether the at least one PDCP PDU is retransmitted may be based on at least one of a power headroom or an expiration of a time period, as described in connection with the examples in FIGS. 4A, 4B, 5, 6, 7, 8A-8D, and 9.

In some aspects, one or more CCs of the plurality of CCs may be selected for the retransmission of the at least one PDCP PDU, as described in connection with the examples in FIGS. 4A, 4B, 5, 6, 7, 8A-8D, and 9. Also, at least one CC of the one or more CCs may be associated with the retransmission of the at least one PDCP PDU when the at least one CC corresponds to an acknowledgement (ACK), as described in connection with the examples in FIGS. 4A, 4B, 5, 6, 7, 8A-8D, and 9. Further, the at least one CC may be dissociated from the retransmission of the at least one PDCP PDU when the at least one CC corresponds to a negative ACK (NACK), as described in connection with the examples in FIGS. 4A, 4B, 5, 6, 7, 8A-8D, and 9.

At 1110, the apparatus may transmit an indication of whether to retransmit the at least one PDCP PDU, as described in connection with the examples in FIGS. 4A, 4B, 5, 6, 7, 8A-8D, and 9. For example, 1110 may be performed by determination component 1340. In some instances, the indication may identify one or more additional CCs of the plurality of CCs for the retransmission of the at least one PDCP PDU, as described in connection with the examples in FIGS. 4A, 4B, 5, 6, 7, 8A-8D, and 9. Also, the indication may be associated with an acknowledgement (ACK) or a negative ACK (NACK). The indication may be transmitted via a medium access control (MA) control element (MAC-CE), as described in connection with the examples in FIGS. 4A, 4B, 5, 6, 7, 8A-8D, and 9.

At 1112, the apparatus may determine whether one or more uplink resources are activated for the retransmission of the at least one PDCP PDU, as described in connection with the examples in FIGS. 4A, 4B, 5, 6, 7, 8A-8D, and 9. For example, 1112 may be performed by determination component 1340.

At 1114, the apparatus may receive a scheduling request (SR) for the retransmission of the at least one PDCP PDU, as described in connection with the examples in FIGS. 4A, 4B, 5, 6, 7, 8A-8D, and 9. For example, 1114 may be performed by determination component 1340.

At 1116, the apparatus may transmit a configuration of one or more uplink resources for the retransmission of the at least one PDCP PDU, where the configuration may be associated with a dynamic grant, as described in connection with the examples in FIGS. 4A, 4B, 5, 6, 7, 8A-8D, and 9. For example, 1116 may be performed by determination component 1340.

At 1118, the apparatus may receive a retransmission of the at least one PDCP PDU based on the determination whether the at least one PDCP PDU is retransmitted, as described in connection with the examples in FIGS. 4A, 4B, 5, 6, 7, 8A-8D, and 9. For example, 1118 may be performed by determination component 1340. In some instances, the retransmission of the at least one PDCP PDU may be received when a PDCP PDU duplication number is less than a maximum threshold or the retransmission of the at least one PDCP PDU is based on a power headroom report (PHR), as described in connection with the examples in FIGS. 4A, 4B, 5, 6, 7, 8A-8D, and 9.

Figure 12:
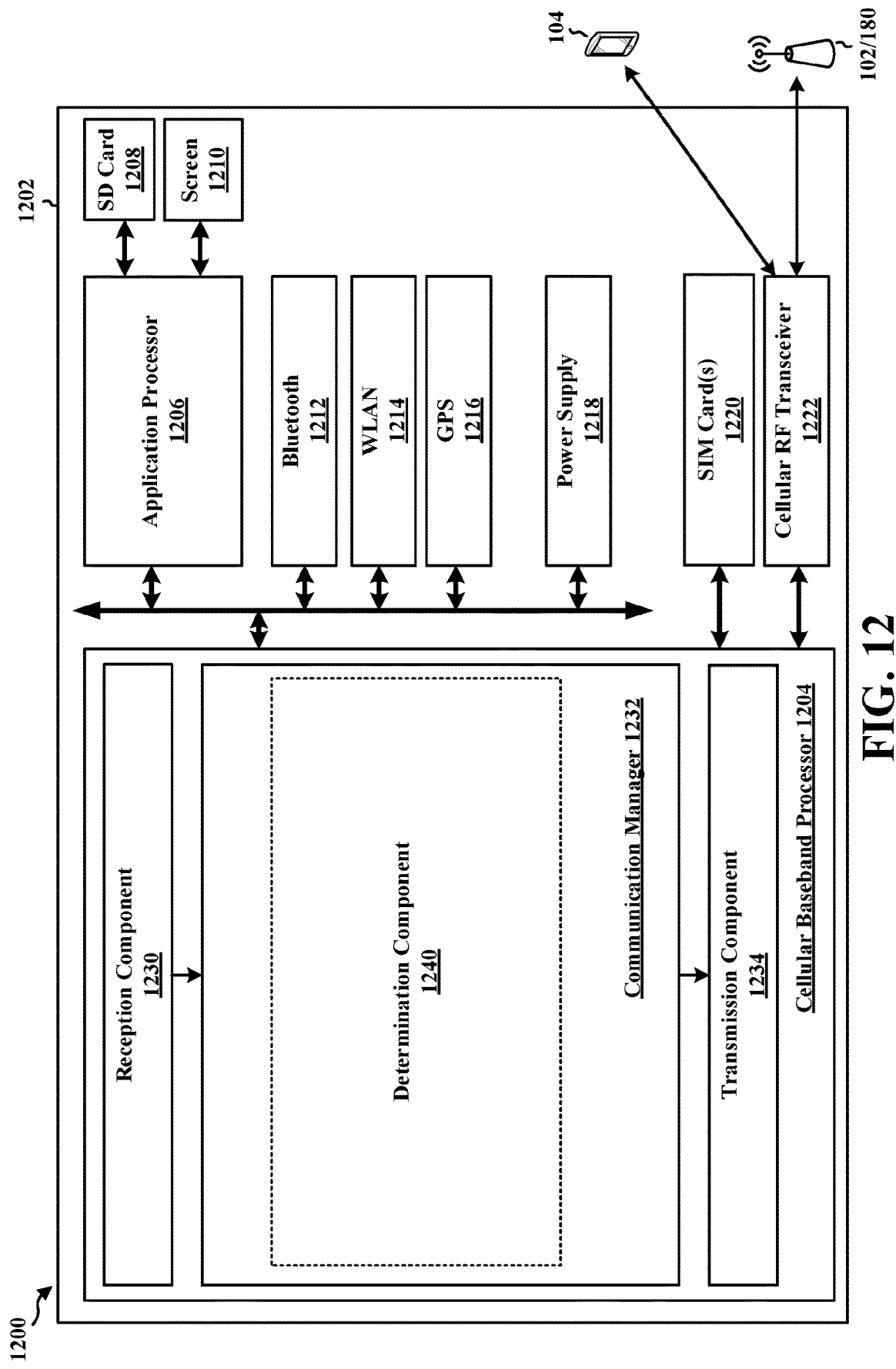
FIG. 12 is a diagram illustrating an example of a hardware implementation for an example apparatus.

FIG. 12 is a diagram 1200 illustrating an example of a hardware implementation for an apparatus 1202. The apparatus 1202 is a UE and includes a cellular baseband processor 1204 (also referred to as a modem) coupled to a cellular RF transceiver 1222 and one or more subscriber identity modules (SIM) cards 1220, an application processor 1206 coupled to a secure digital (SD) card 1208 and a screen 1210, a Bluetooth module 1212, a wireless local area network (WLAN) module 1214, a Global Positioning System (GPS) module 1216, and a power supply 1218. The cellular baseband processor 1204 communicates through the cellular RF transceiver 1222 with the UE 104 and/or BS 102/180. The cellular baseband processor 1204 may include a computer-readable medium/memory. The computer-readable medium/memory may be non-transitory. The cellular baseband processor 1204 is responsible for general processing, including the execution of software stored on the computer-readable medium/memory. The software, when executed by the cellular baseband processor 1204, causes the cellular baseband processor 1204 to perform the various functions described supra. The computer-readable medium/memory may also be used for storing data that is manipulated by the cellular baseband processor 1204 when executing software. The cellular baseband processor 1204 further includes a reception component 1230, a communication manager 1232, and a transmission component 1234. The communication manager 1232 includes the one or more illustrated components. The components within the communication manager 1232 may be stored in the computer-readable medium/memory and/or configured as hardware within the cellular baseband processor 1204. The cellular baseband processor 1204 may be a component of the UE 350 and may include the memory 360 and/or at least one of the TX processor 368, the RX processor 356, and the controller/processor 359. In one configuration, the apparatus 1202 may be a modem chip and include just the baseband processor 1204, and in another configuration, the apparatus 1202 may be the entire UE (e.g., see 350 of FIG. 3) and include the aforediscussed additional modules of the apparatus 1202.

The communication manager 1232 includes a determination component 1240 that is configured to transmit a list of a plurality of component carriers (CCs) for a transmission of at least one packet data convergence protocol (PDCP) protocol data unit (PDU), the plurality of CCs corresponding to a plurality of indicated CCs, e.g., as described in connection with step 1004 above. Determination component 1240 can also be configured to transmit the at least one PDCP PDU on one or more CCs of the plurality of CCs, e.g., as described in connection with step 1008 above. Determination component 1240 can also be configured to determine whether to retransmit the at least one PDCP PDU, a retransmission of the at least one PDCP PDU being associated with a PDCP duplication procedure, e.g., as described in connection with step 1010 above.

The apparatus may include additional components that perform each of the blocks of the algorithm in the aforementioned flowcharts of FIGS. 9 and 10. As such, each block in the aforementioned flowcharts of FIGS. 9 and 10 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1202, and in particular the cellular baseband processor 1204, includes means for transmitting a list of a plurality of component carriers (CCs) for a transmission of at least one packet data convergence protocol (PDCP) protocol data unit (PDU), the plurality of CCs corresponding to a plurality of indicated CCs. The apparatus 1202 can also include means for transmitting the at least one PDCP PDU on one or more CCs of the plurality of CCs. The apparatus 1202 can also include means for determining whether to retransmit the at least one PDCP PDU, a retransmission of the at least one PDCP PDU being associated with a PDCP duplication procedure. The aforementioned means may be one or more of the aforementioned components of the apparatus 1202 configured to perform the functions recited by the aforementioned means. As described supra, the apparatus 1202 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 13:
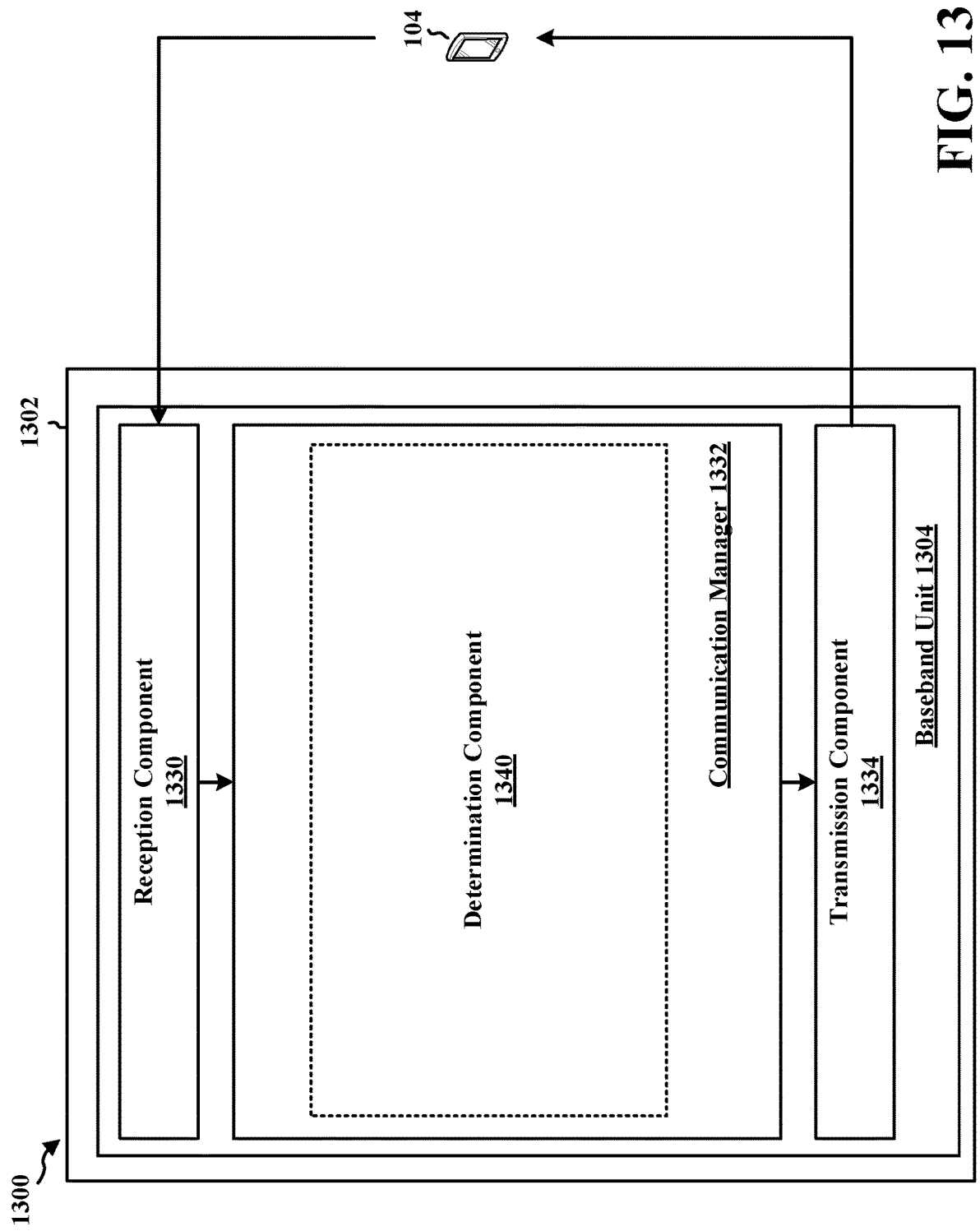
FIG. 13 is a diagram illustrating an example of a hardware implementation for an example apparatus.

FIG. 13 is a diagram 1300 illustrating an example of a hardware implementation for an apparatus 1302. The apparatus 1302 is a base station and includes a baseband unit 1304. The baseband unit 1304 may communicate through a cellular RF transceiver with the UE 104. The baseband unit 1304 may include a computer-readable medium/memory. The baseband unit 1304 is responsible for general processing, including the execution of software stored on the computer-readable medium/memory. The software, when executed by the baseband unit 1304, causes the baseband unit 1304 to perform the various functions described supra. The computer-readable medium/memory may also be used for storing data that is manipulated by the baseband unit 1304 when executing software. The baseband unit 1304 further includes a reception component 1330, a communication manager 1332, and a transmission component 1334. The communication manager 1332 includes the one or more illustrated components. The components within the communication manager 1332 may be stored in the computer-readable medium/memory and/or configured as hardware within the baseband unit 1304. The baseband unit 1304 may be a component of the BS 310 and may include the memory 376 and/or at least one of the TX processor 316, the RX processor 370, and the controller/processor 375.

The communication manager 1332 includes a determination component 1340 that is configured to receive a list of a plurality of component carriers (CCs) for a transmission of at least one packet data convergence protocol (PDCP) protocol data unit (PDU), the plurality of CCs corresponding to a plurality of indicated CCs, e.g., as described in connection with step 1104 above. Determination component 1340 can also be configured to determine whether the at least one PDCP PDU is retransmitted, a retransmission of the at least one PDCP PDU being associated with a PDCP duplication procedure, e.g., as described in connection with step 1108 above.

The apparatus may include additional components that perform each of the blocks of the algorithm in the aforementioned flowcharts of FIGS. 9 and 11. As such, each block in the aforementioned flowcharts of FIGS. 9 and 11 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1302, and in particular the baseband unit 1304, includes means for receiving a list of a plurality of component carriers (CCs) for a transmission of at least one packet data convergence protocol (PDCP) protocol data unit (PDU), the plurality of CCs corresponding to a plurality of indicated CCs. The apparatus 1302 can also include means for determining whether the at least one PDCP PDU is retransmitted, a retransmission of the at least one PDCP PDU being associated with a PDCP duplication procedure. The aforementioned means may be one or more of the aforementioned components of the apparatus 1302 configured to perform the functions recited by the aforementioned means. As described supra, the apparatus 1302 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication of a user equipment (UE), comprising:
   transmitting a list of a plurality of component carriers (CCs) for a transmission of at least one packet data convergence protocol (PDCP) protocol data unit (PDU), the plurality of CCs corresponding to a plurality of indicated CCs;
   transmitting the at least one PDCP PDU on one or more CCs of the plurality of CCs; and
   determining whether to retransmit the at least one PDCP PDU, a retransmission of the at least one PDCP PDU being associated with a PDCP duplication procedure.

2. The method of claim 1, further comprising:
   selecting one or more CCs of the plurality of CCs for the retransmission of the at least one PDCP PDU.

3. The method of claim 2, wherein at least one CC of the one or more CCs is associated with the retransmission of the at least one PDCP PDU when the at least one CC corresponds to an acknowledgement (ACK); or wherein the at least one CC is dissociated from the retransmission of the at least one PDCP PDU when the at least one CC corresponds to a negative ACK (NACK).

4. The method of claim 1, further comprising:
   receiving an indication of whether to retransmit the at least one PDCP PDU.

5. The method of claim 4, wherein the indication identifies one or more additional CCs of the plurality of CCs for the retransmission of the at least one PDCP PDU.

6. The method of claim 4, wherein the indication is associated with an acknowledgement (ACK) or a negative ACK (NACK).

7. The method of claim 4, wherein the indication is received via a medium access control (MA) control element (MAC-CE).

8. The method of claim 1, further comprising:
   retransmitting the at least one PDCP PDU based on the determination whether to retransmit the at least one PDCP PDU.

9. The method of claim 8, wherein the at least one PDCP PDU is retransmitted when a PDCP PDU duplication number is less than a maximum threshold or the retransmission of the at least one PDCP PDU is based on a power headroom report (PHR).

10. An apparatus for wireless communication of a user equipment (UE), comprising:
    a memory; and
    at least one processor coupled to the memory and configured to:
    transmit a list of a plurality of component carriers (CCs) for a transmission of at least one packet data convergence protocol (PDCP) protocol data unit (PDU), the plurality of CCs corresponding to a plurality of indicated CCs;
    transmit the at least one PDCP PDU on one or more CCs of the plurality of CCs; and
    determine whether to retransmit the at least one PDCP PDU, a retransmission of the at least one PDCP PDU being associated with a PDCP duplication procedure.

11. The apparatus of claim 10, wherein the at least one processor is further configured to:
    select one or more CCs of the plurality of CCs for the retransmission of the at least one PDCP PDU.

12. The apparatus of claim 11, wherein at least one CC of the one or more CCs is associated with the retransmission of the at least one PDCP PDU when the at least one CC corresponds to an acknowledgement (ACK); or wherein the at least one CC is dissociated from the retransmission of the at least one PDCP PDU when the at least one CC corresponds to a negative ACK (NACK).

13. The apparatus of claim 10, wherein the at least one processor is further configured to:
    receive an indication of whether to retransmit the at least one PDCP PDU.

14. The apparatus of claim 13, wherein the indication identifies one or more additional CCs of the plurality of CCs for the retransmission of the at least one PDCP PDU.

15. The apparatus of claim 13, wherein the indication is associated with an acknowledgement (ACK) or a negative ACK (NACK).

16. The apparatus of claim 13, wherein the indication is received via a medium access control (MA) control element (MAC-CE).

17. The apparatus of claim 10, wherein the at least one processor is further configured to:
    retransmit the at least one PDCP PDU based on the determination whether to retransmit the at least one PDCP PDU.

18. The apparatus of claim 17, wherein the at least one PDCP PDU is retransmitted when a PDCP PDU duplication number is less than a maximum threshold or the retransmission of the at least one PDCP PDU is based on a power headroom report (PHR).

19. The apparatus of claim 10, wherein the at least one processor is further configured to:
receive a configuration of one or more uplink resources for the transmission of the at least one PDCP PDU, wherein the configuration is associated with a configured grant.

20. The apparatus of claim 10, wherein the at least one processor is further configured to:
receive a configuration of one or more uplink resources for the retransmission of the at least one PDCP PDU, wherein the configuration is associated with a dynamic grant.

21. The apparatus of claim 10, wherein the at least one processor is further configured to:
determine whether to activate one or more uplink resources for the retransmission of the at least one PDCP PDU.

22. The apparatus of claim 10, wherein the at least one processor is further configured to:
transmit a scheduling request (SR) for the retransmission of the at least one PDCP PDU.

23. The apparatus of claim 10, wherein the at least one processor is further configured to:
receive an indication of the plurality of CCs for the transmission of the at least one PDCP PDU.

24. The apparatus of claim 10, wherein the determination whether to retransmit the at least one PDCP PDU is associated with a feedback of at least one physical layer.

25. The apparatus of claim 10, wherein the determination whether to retransmit the at least one PDCP PDU is based on at least one of a power headroom or an expiration of a time period.

26. An apparatus for wireless communication of a base station, comprising:
a memory; and
at least one processor coupled to the memory and configured to:
receive a list of a plurality of component carriers (CCs) for a transmission of at least one packet data convergence protocol (PDCP) protocol data unit (PDU), the plurality of CCs corresponding to a plurality of indicated CCs; and
determine whether the at least one PDCP PDU is retransmitted, a retransmission of the at least one PDCP PDU being associated with a PDCP duplication procedure.

27. The apparatus of claim 26, wherein one or more CCs of the plurality of CCs are selected for the retransmission of the at least one PDCP PDU.

28. The apparatus of claim 26, wherein the at least one processor is further configured to:
transmit an indication of whether to retransmit the at least one PDCP PDU.

29. The apparatus of claim 26, wherein the at least one processor is further configured to:
receive a retransmission of the at least one PDCP PDU based on the determination whether the at least one PDCP PDU is retransmitted.

30. The apparatus of claim 29, wherein the retransmission of the at least one PDCP PDU is received when a PDCP PDU duplication number is less than a maximum threshold or the retransmission of the at least one PDCP PDU is based on a power headroom report (PHR).

* * * * *